J. J. H. STURMEY.
BRACKET FOR CONVERTING PLEASURE MOTOR VEHICLES INTO MOTOR TRACTORS OR TRUCKS.
APPLICATION FILED SEPT. 12, 1919.
1,370,616.
Patented Mar. 8, 1921.
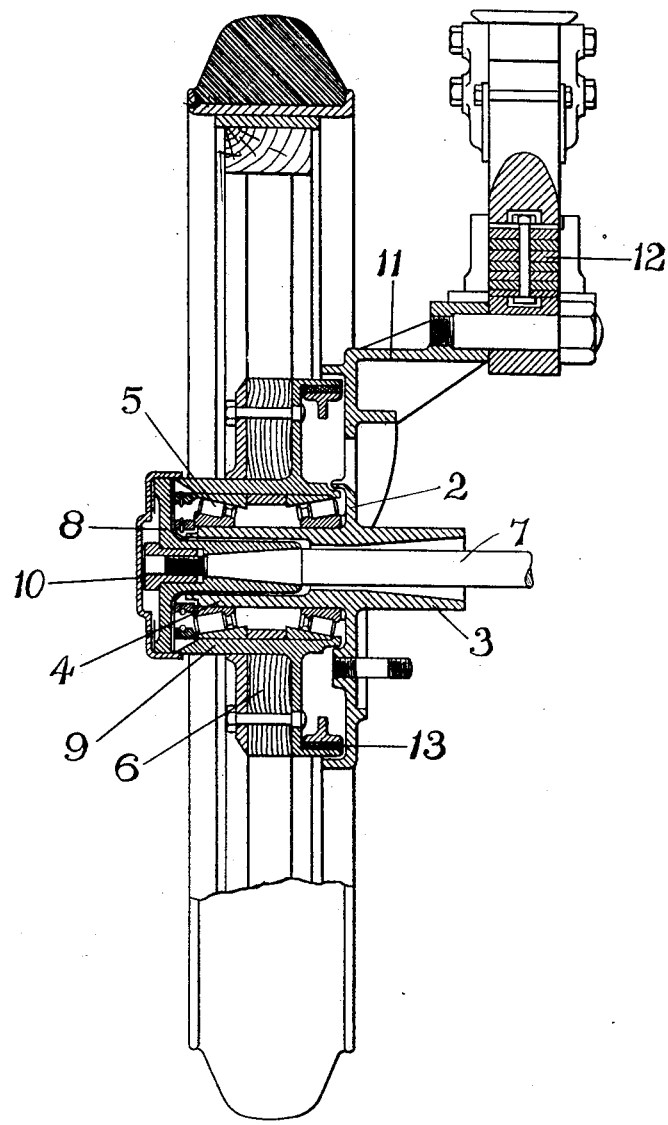

UNITED STATES PATENT OFFICE.

JOHN JAMES HENRY STURMEY, OF COVENTRY, ENGLAND.

BRACKET FOR CONVERTING PLEASURE MOTOR-VEHICLES INTO MOTOR TRACTORS OR TRUCKS.

1,370,616.

Specification of Letters Patent.

Patented Mar. 8, 1921.

Application filed September 12, 1919. Serial No. 323,354.

*To all whom it may concern:*

Be it known that I, JOHN JAMES HENRY STURMEY, a subject of Great Britain, residing at Coventry, in the county of Warwick, England, have invented certain new and useful Improvements in Brackets for Converting Pleasure Motor-Vehicles into Motor Tractors or Trucks, of which the following is a specification.

This invention has reference to certain improvements in conversion units for motor vehicles of the kind whereby an ordinary motor vehicle nominally intended to carry passengers may be quickly converted into a commercial vehicle of the truck or tractor type adapted to carry or pull heavy loads.

The object of this invention is to construct and apply conversion units of the kind referred to in such a manner that all load stress is removed not only from the existing axle casing of the vehicle but also from the driving axle shafts as well.

According to the present invention these important advantages are obtained by means of a construction and arrangement of conversion unit which enables an axle of the full floating type to be employed while at the same time a firmer mutual support between the unit and the axle casing is secured.

The bracket or body of the unit which normally bolts onto the belled end of the axle casing is formed with a stout tubular center piece set at right angles to its face and projecting a suitable distance inwardly and outwardly.

The inwardly directed portion of the tubular center piece fits snugly within the end of the axle casing which it strengthens and is in turn thereby assisted in securing a firmer and more rigid attachment for the bracket. The outwardly projecting portion of the tubular center piece serves as a bearing support upon which the tractor wheel runs, being driven as is usual in motorcar axles of the full floating type by a driving dog attached to the end of the axle shaft.

Referring to the drawing, which shows in vertical section one half of the complete unit embodying this invention, the bracket 2, as will be seen, is formed with a central tubular member preferably cast integrally therewith. One end 3 of this tubular member projects inwardly to receive and support the adjacent end of the axle casing (not shown) the belled or flanged end of which is bolted as usual to the bracket 2. The other end 4 of the tubular member projects outwardly from and at right angles to the bracket and is adapted to carry a bearing 5 of substantial dimensions for the tractor wheel 6. It will be noticed that the axle shaft 7 is entirely free, its sole function being to drive the wheel 6 for which purpose it carries a driving dog 8 at its outer end in operative connection with the hub 9 of the wheel and inclosed within the hub cap 10.

In all other respects the bracket 2 is substantially the same as at present employed, being provided with an inwardly projecting arm 11 adapted to take the load through the auxiliary springs 12.

Incidentally the construction of bracket above described involves and permits the use of a brake 13 of larger diameter than usual.

Where the fitting is applied to a Ford chassis the usual roller bearings which support the outer ends of the driving shafts within the axle casing are removed prior to the latter being bolted up to the bracket 2, thus leaving the shafts free-ended or floating.

So far from the axle casings being subject to any load they are in fact by means of the improved bracket herein described supported and steadied by the inwardly projecting portion 3 of the central tubular member of the bracket and a firmer attachment of the latter to the axle casing is secured by reason of the spigoted connection between them.

What I claim and desire to secure by Letters Patent of the United States is,

1. Conversion units for motor vehicles of the character described each consisting of a bracket having a central tubular member one end of which is adapted to enter and support the belled end of an axle casing on the side removed from the wheel while the other end carries a bearing for the road wheel concentric with the axle.

2. A conversion unit for motor vehicles of the class described, comprising a bracket adapted for direct attachment to an end of an axle casing and having a central tubular member one end of which is arranged to enter and support the end of the axle casing on the side remote from the wheel, the opposite end of said tubular member having on its outer surface a bearing for the road wheel concentric with the axle, said tubular member inclosing the end of the axle but not providing a support therefor.

3. A conversion unit for motor vehicles of the class described, comprising a bracket adapted for direct attachment to an end of an axle casing and having a central tubular member one end of which is arranged to enter and support the end of the axle casing on the side remote from the wheel, the opposite end of said tubular member having on its outer surface a bearing for the road wheel concentric with the axle, said tubular member inclosing the end of the axle but not providing a support therefor, and supplementary vehicle springs carried by said bracket.

4. A conversion unit for motor vehicles of the class described, comprising a bracket adapted for direct attachment to an end of an axle casing and having a central tubular member one end of which is arranged to enter and support the end of the axle, casing on the side remote from the wheel, the opposite end of said tubular member having on its outer surface a bearing for the road wheel concentric with the axle, said tubular member inclosing the end of the axle but not providing a support therefor, a tractor wheel mounted on said bearing, a driving dog secured to the end of said axle within and out of contact with said tubular member and in operative driving relation to said wheel, and means for inclosing said dog.

In testimony whereof I hereto affix my signature in presence of two witnesses.

JOHN JAMES HENRY STURMEY.

Witnesses:
   A. HENRY CYL,
   ALMA HICKEN.